United States Patent [19]

Andres et al.

[11] 3,918,545
[45] Nov. 11, 1975

[54] MOTOR VEHICLES WITH A RETAINING SYSTEM FOR THE PASSENGERS

[75] Inventors: Rudolf Andres, Sindelfingen; Heinz W. Knoll, Stuttgart, both of Germany

[73] Assignee: Daimler-Benz Aktiengesellschaft, Germany

[22] Filed: Oct. 11, 1973

[21] Appl. No.: 405,270

[30] Foreign Application Priority Data
Oct. 11, 1972 Germany............................ 2249759

[52] U.S. Cl.......... 180/82 C; 180/101; 280/150 SB; 244/122 B
[51] Int. Cl.²........................................ B60R 21/10
[58] Field of Search..... 180/82 C, 101; 280/150 SB, 280/150 AB; 244/122 B, 122 R; 242/107 R; 297/388, 385, 386

[56] References Cited
UNITED STATES PATENTS

| | | | |
|---|---|---|---|
| 2,880,815 | 4/1959 | Apfelbaum................ | 280/150 SB X |
| 3,022,089 | 2/1962 | Botar.......................... | 280/150 SB X |
| 3,219,297 | 11/1965 | Kenyon.......................... | 244/122 B |
| 3,240,510 | 3/1966 | Spouge........................... | 180/82 C |
| 3,534,190 | 10/1970 | Lindblad.................. | 280/140 SB X |
| 3,653,714 | 4/1972 | Gentile............................. | 180/82 C |
| 3,743,046 | 7/1973 | Rothschild...................... | 180/82 C |
| 3,744,815 | 7/1973 | Scherenberg................ | 280/150 A |

FOREIGN PATENTS OR APPLICATIONS

| | | | |
|---|---|---|---|
| 1,258,697 | 3/1961 | France.......................... | 280/150 SB |

*Primary Examiner*—Kenneth H. Betts
*Attorney, Agent, or Firm*—Craig & Antonelli

[57] ABSTRACT

A motor vehicle with a retaining system for the passengers which includes at least one safety belt as well as means for the automatic re-tightening of the safety belt in case of accident danger; the magnitude of the prestress of the safety belt is thereby adjustable by a control system, which is triggered by a sensor with a definite deceleration threshold, as a function of vehicle velocity change per time unit and/or weight of the respectively retained passenger.

30 Claims, 1 Drawing Figure

U.S. Patent  Nov. 11, 1975  3,918,545
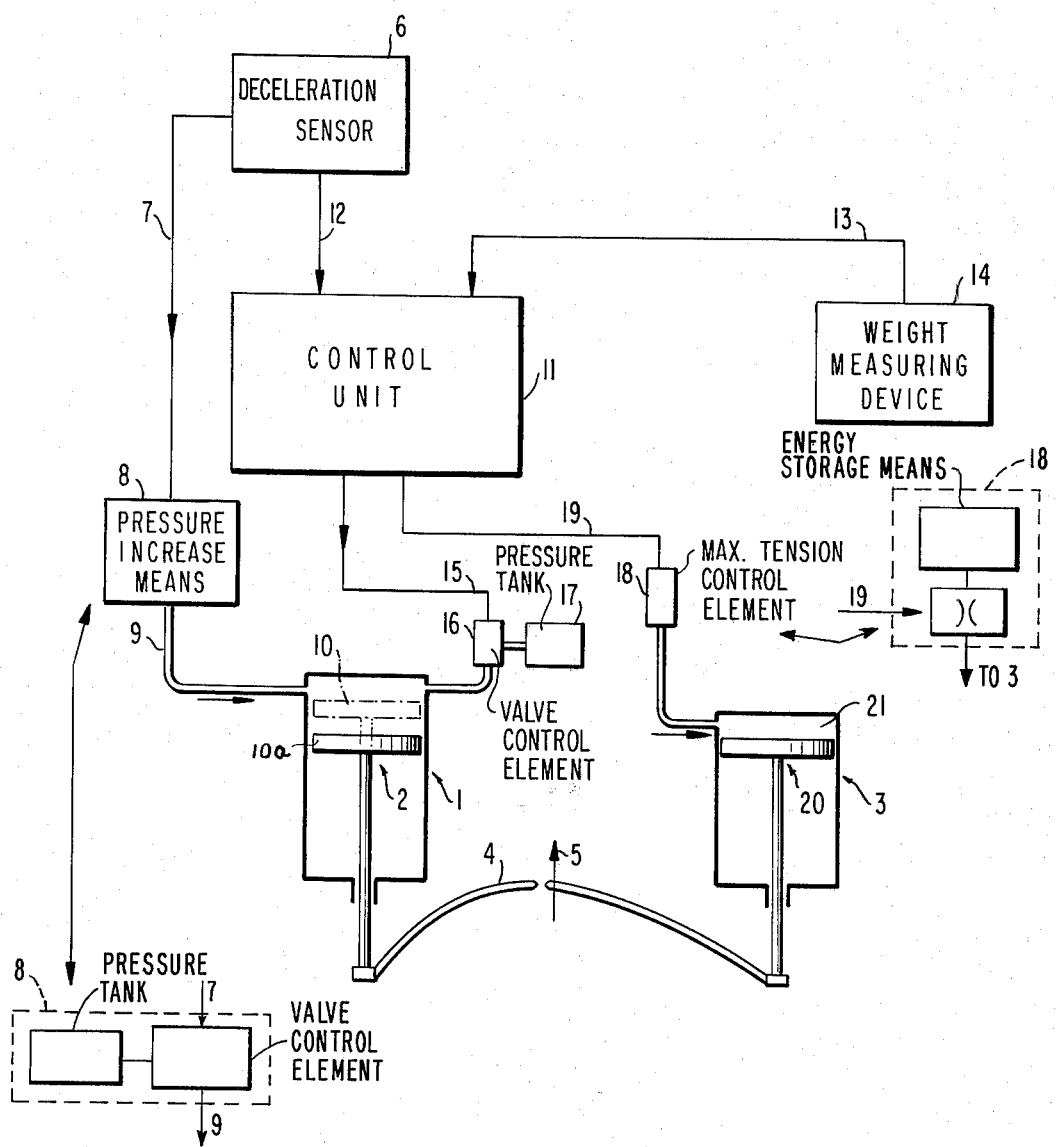

MOTOR VEHICLES WITH A RETAINING SYSTEM FOR THE PASSENGERS

The present invention relates to a motor vehicle with a retaining system for the passengers which includes at least one safety belt as well as means for the automatic re-tightening of the safety belt in the event of danger.

In one prior art retaining system of this type, the safety belt is re-tightened to such an extent during contact of the vehicle with the respective obstacle as is normally possible without injury danger for the respective passenger. This re-tightening, by means of which the so-called belt looseness is eliminated, thereby takes place always up to a predetermined limit value considered as still tolerable for a "normal" passenger independently of the gravity of the collision to be expected. The known prior art system is therefore designed only for one operating condition, and the values of velocity change per time unit and the driving velocity, which change from case to case, are not detected thereby. As a result thereof, the safety for the passengers of a motor vehicle attainable by belts is not fully exhausted, and it is the aim of the present invention to further develop in this sense a retaining system of the type described above for the passengers of motor vehicles.

According to the present invention, this is achieved with a motor vehicle having a retaining system for the passengers which includes at least one safety belt as well as means for the automatic re-tightening of the safety belt in the event of a danger, in that the magnitude of the prestress of the belt is adjustable by a control system which is adapted to be triggered by means of a sensor having a definite deceleration threshold, in dependence on the velocity change of the vehicle per time unit and/or for example, on the weight of the respectively retained passenger. Appropriately, the magnitude of the prestress force is thereby changeable in one or several steps or also regulatable steplessly.

Especially the multi-step of stepless controllability of the prestress is appropriate because it is thus possible to utilize the triggering or engaging pulse of the sensor, by means of which the control unit of the contol system is turned-on, to the effect that at first a slight prestress is applied to the belts. If, in the further course, no vehicle deceleration occurs which exceeds the triggering threshold of the sensor readying the control unit, then after the lapse of a certain time period after the triggering by the sensor, an automatic disengagement of the control system and in a corresponding manner a loosening of the belt may take place. If following the pulse caused by the response of the sensor a further and greater vehicle deceleration results, then with a multistep or stepless control of the prestress, the latter may be matched to the corresponding deceleration, i.e., to the velocity change of the vehicle per time unit and possibly also to the weight of the respectively retained vehicle passenger or to any other desired influencing magnitude.

A particularly effective passenger protective system results thereby in connection with the further measure according to the present invention that with an existing conventional belt force limiter, the retaining force thereof is also changeable as a function of the vehicle deceleration and/or the weight of the respectively retained passenger. Especially in conjunction with this second measure, it becomes possible within the scope of the present invention to reach an optimum utilization of the existing vehicle interior space for the deceleration of the passenger whereby the retaining forces acting on the passenger by way of the belt can be adjusted in dependence on the type and strength of the impact. In particular, with the solution of the present invention, also changes in the deceleration progress can be detected.

The prestress force and/or the retaining force of the belt may thereby be changeable within the scope of the solution of the present invention by an actuation utilizing an auxiliary force under interposition of an energy storage means. Especially for the application of slight prestress forces, however, also other mechanical, pyrotechnical, hydraulic, pneumatic or electric tensioning devices of any known type may be used.

Accordingly, it is an object of the present invention to provide a motor vehicle equipped with a retaining system for the passengers thereof which avoids by simple means the aforementioned shortcomings and drawbacks encountered in the prior art.

Another object of the present invention resides in a retaining system for the passengers of a motor vehicle which assures greater safety for the passengers in case of an accident.

A further object of the present invention resides in a retaining system for the passengers of a motor vehicle which is able to take into consideration various factors such as the deceleration and velocity of the vehicle caused by an accident as well as also possibly the weight of the passengers retained by a belt.

A still further object of the present invention resides in a retaining system for the passengers of motor vehicles which permits optimization of the space available on the inside of the vehicle as regards the safety of passengers of a motor vehicle.

These and other objects, features and advantages of the present invention will become more apparent from the following description when taken in connection with the accompanying drawing which shows, for purposes of illustration only, one embodiment in accordance with the present invention, and wherein:

The single FIGURE is a schematic diagrammatic view, partially in block diagram, of a retaining system in accordance with the present invention.

Referring now to the single FIGURE of the drawing, reference numeral 1 generally designates in the diagrammatic illustration, a multi-state tensioning or tightening element in the form of a tensioning cylinder, by means of which the belt 4 is prestressed when the piston 2 is extended, i.e., is displaced downwardly in the drawing. Reference numeral 3 generally designates in the schematic view a belt-force limiter of conventional construction and therefore indicated only schematically which in the illustrated embodiment is formed by a hydraulic or pneumatic cylinder though any other belt-limiter, as known in the art, may be used. One end of a belt 4 are each coordinated in the illustrated embodiment to the tightening element 1 for the elimination of the belt looseness and to the belt-force limiter 3; the belt 4, in relation to a frontal impact, is stressed by the pasenger (not shown) retained by the belt in the direction of arrow 5.

If a deceleration value is exceeded by the vehicle, i.e., if the deceleration value is larger than a predetermined value, at which the sensor 6 responds which has a definite deceleration threshold, then the sensor 6 produces a switching pulse which, by way of line 7, causes at first a response of the element 8 which may be a pump, energy storage device or the like, operable to produce a pressure increase in the cylinder 1, and by means of which a certain amount of pressure medium is fed to the tightening element 1 by way of the line 9, whereby this quantity is so selected that a predetermined prestress results. The position of the piston 2 after the feed of the pressure medium is shown in dash and dot line and the piston is designated in this position by reference numeral 10 indicating its position in which any belt looseness has been eliminated. The sensor 6 is a conventional deceleration sensor having a predetermined threshold, known in the art, and therefore not described herein any further.

At the same time, the control unit 11 of a control system connected to sensor 6 by way of line 12, is caused to respond by the switching pulse of the sensor 6 and initially is merely set into operation readiness. If the vehicle deceleration now exceeds the limit value at which the sensor 6 initially only responds and, on the one hand, is to effect a certain prestress of the belt 4 by a further tightening thereof, and, on the other, is to engage the control unit 11, i.e., cause the same to operate, then at first a further increase of the belt tension is initiated by the control unit 11 corresponding to the magnitude of the deceleration. The control unit 11 thereby takes into consideration, in addition to the vehicle velocity and the vehicle deceleration which are detected by the sensor 6, the weight of the passenger respectively retained by the belt which is fed into the control unit as a further input signal. The input of the passenger weight takes place by way of the line 13 which is connected to a corresponding measuring device 14, again of conventional construction. Corresponding to the force acting on the belt 4, which is to be expected by reason of the passenger weight and the vehicle deceleration, the prestress of the belt 4 is now further increased until the piston reaches its full line position 10a, whereby the upper limit value is given by the loads which are still tolerable for a human being without injury danger. The further increase of the belt tensioning takes place in that a control element 16 is caused to respond by the control unit 11 by way of the line 15; the control unit 16 may be formed, for example, by a valve of conventional construction by means of which the connection from a pressure tank 17 to the tensioning cylinder 1 is opened up. The magnitude of the extension stroke of the piston 2 and therewith the magnitude of the prestress is adjusted by way of the control element 16 corresponding to the command signals of the control unit 11.

In addition to the tightening element 1, the belt force limiter 3 acts on the belt 4, by means of which the magnitude of the retaining force and therewith the deceleration of the passengers is to be limited to a maximum value which is to lie below the threshold still tolerable without injury. The distance to this threshold is thereby to be determined in dependence on the path available on the inside of the vehicle, taking into consideration the vehicle deceleration and passenger weight, which is achieved by way of the control unit 11. Consequently, in the illustrated embodiment, a control element 18 is caused to respond also by way of the control unit 11, which is connected with the control unit 11 by way of the line 19 and which, for example, may be constructed as valve throttle or the like. Of course, any other known control element may be used for the control element 18 to limit the maximum force of the belt 4. The full line position of piston 20 is only a schematic showing thereof as in actual practice and operation, its position would be further extended, i.e., displaced downwardly in the drawing in order to make available the largest possible displacement path in case of need.

The control unit 11 utilizes conventional logic elements, known as such in the art, to produce the control signals for the control elements 16 and 18 as a function of deceleration and weight. Since the described control can be readily achieved by conventional logic elements, as known to those skilled in the art, a detailed description of the control unit 11 is dispensed with herein for the sake of simplicity.

While we have shown and described only one embodiment in accordance with the present invention, it is understood that the same is not limited thereto but is susceptible of numerous changes and modifications as known in those skilled in the art. For example, conventional elements, other than those mentioned, may be used for the various parts shown in block diagram, as commercially available. Hence, we do not wish to be limited to the details shown and described herein or to any particular elements, as shown or described herein, but intend to cover all such changes and modifications as are encompassed by the scope of the appended claims.

We claim:

1. In a vehicle retaining system for passengers, said retaining system comprising at least one safety belt means, sensor means for sensing the occurrence of passenger danger and belt-tightening means for automatically tightening said safety belt means to a predetermined pretension on said passengers at a predetermined deceleration threshold sensed by said sensor means, the improvement comprising control means for varying tension of said safety belt means on said passengers upon exceeding said predetermined deceleration threshold as a function of at least one of two control signals respectively representative of vehicle velocity change per time unit and weight of the respectively retained passengers.

2. A vehicle retaining system according to claim 1, wherein said control means varies said tension stepwise.

3. A vehicle retaining system according to claim 2, wherein said tension is varied in one step.

4. A vehicle retaining system according to claim 3, wherein said tension is varied in several steps.

5. A vehicle retaining system according to claim 1, wherein said control means continuously varies said tension.

6. A vehicle retaining system according to claim 1, wherein said retaining system further comprises a belt-force limiting means for controlling the retaining force of said safety belt means on said passengers, said belt-force limiting means being controlled by said control means as a function of at least one of said two control signals.

7. A vehicle retaining system according to claim 6, wherein said retaining force is controlled as a function of both of said two control signals.

8. A vehicle retaining system according to claim 6, wherein said control means varies said tension by means of an energy storage means operatively connected to said belt-tightening means.

9. A vehicle retaining system according to claim 8, wherein said energy storage means includes at least one of a pump and a pressure storage tank.

10. A vehicle retaining system according to claim 9, wherein said energy storage means is a pressure storage tank, said pressure storage tank being connected to said belt-tightening means by valve means.

11. A vehicle retaining system according to claim 10, wherein said valve means is controlled by said control means.

12. A vehicle retaining system according to claim 8, wherein said control means controls said retaining force by means of an energy storage means operatively connected to said belt-force limiting means.

13. A vehicle retaining system according to claim 12, wherein said energy storage means is connected to said belt-force limiting means by a throttle valve means.

14. A vehicle retaining system according to claim 12, wherein said control means varies said tension stepwise.

15. A vehicle retaining system according to claim 12, wherein said control means continuously varies said tension.

16. A vehicle retaining system according to claim 12, wherein said control means is activated by said sensor means at said predetermined deceleration threshold.

17. A vehicle retaining system according to claim 1, wherein said control means is activated by said sensor means at said predetermined deceleration threshold.

18. A vehicle retaining system according to claim 17, wherein said retaining system further comprises a belt-force limiting means for controlling the retaining force of said safety belt means on said passengers, said belt-force limiting means being controlled by said control means as a function of at least one of said two control signals.

19. A vehicle retaining system according to claim 18, wherein said retaining force is controlled as a function of both of said two control signals.

20. In a vehicle retaining system for passengers, said retaining system including at least one safety belt means and belt-tightening means for automatically tightening said safety belt means on the occurrence of passenger danger, the improvement comprising control means for controlling the magnitude of prestress of said safety belt means on said passengers as a function of two control signals representing respectively vehicle velocity change per time unit and weight of the respectively retained passengers, said control means being activated by a sensor means at a predetermined deceleration threshold.

21. A vehicle retaining system according to claim 20, wherein said control means varies said tension stepwise.

22. A vehicle retaining system according to claim 20, wherein said control means continuously varies said tension.

23. A vehicle retaining system according to claim 20, wherein said retaining system further comprises a belt-force limiting means for controlling the retaining force of said safety belt means on said passengers, said belt-force limiting means being controlled by said control means as a function of at least one of said two control signals.

24. A vehicle retaining system according to claim 23, wherein said retaining force is controlled as a function of both of said two control signals.

25. A vehicle retaining system according to claim 24, wherein said control means varies said tension by means of an energy storage means operatively connected to said belt-tightening means.

26. A vehicle retaining system according to claim 25, wherein said energy storage means includes at least one of a pump and a pressure storage tank.

27. A vehicle retaining system according to claim 26, wherein said energy storage means is a pressure storage tank, said pressure storage tank being connected to said belt-tightening means by valve means.

28. A vehicle retaining system according to claim 27, wherein said valve means is controlled by said control means.

29. A vehicle retaining system according to claim 25, wherein said control means controls said retaining force by means of an energy storage means operatively connected to said belt-force limiting means.

30. A vehicle retaining system according to claim 29, wherein said energy storage means is connected to said belt-force limiting means by a throttle valve means.

* * * * *